United States Patent

[11] 3,579,109

| [72] | Inventor | Derek J. Hatley |
| | | Monroe, N.Y. |
| [21] | Appl. No. | 812,691 |
| [22] | Filed | Apr. 2, 1969 |
| [45] | Patented | May 18, 1971 |
| [73] | Assignee | General Dynamics Corporation |

[54] AUTOMATIC EQUALIZER FOR DIGITAL DATA TRANSMISSION SYSTEMS
21 Claims, 10 Drawing Figs.

[52] U.S. Cl. .................................................. 325/42,
178/69, 325/65, 328/155, 328/162
[51] Int. Cl. ...................................................... H03k 13/34

[50] Field of Search........................................... 340/172.5
(Inquired), 146.1; 325/38, 39, 41, 42, 65, 6;
333/17, 18; 328/15 (S), 162, 163, 164; 178/69

[56] References Cited
UNITED STATES PATENTS

| 3,436,478 | 4/1969 | Ehrat.............................. | 340/146.1 |
| 3,445,771 | 5/1969 | Clapham et al................ | 325/42 |

*Primary Examiner*—Benedict V. Safourek
*Attorney*—Martin Lukacher

ABSTRACT: An adaptive equalizer is described wherein the data signal received from a line is digitized and is digitally corrected on a serial bit-by-bit basis so as to compensate for any distortion introduced by the transmission channel.

INVENTOR.
DEREK J. HATLEY

BY [signature] ATTY

DATA AND DECISION THRESHOLD TABLE

| ANALOG | $P_{15}P_{14}P_{13}P_{12}P_{11}P_{10}$ $A_S A_7 A_6 A_5 A_4 A_3$ | a b c d | x y | SIGN OF ε (Z) | DISTORTION REGIONS |
|---|---|---|---|---|---|
| +4 | 0 1 0 0 0 0 | 0 0 0 1 | 0 0 | 1 | d |
|    | 0 0 1 1 1 1 | 0 0 0 1 | 0 0 | 1 |   |
|    | 0 0 1 1 1 0 | 0 0 0 1 | 0 0 | 1 |   |
|    | 0 0 1 1 0 1 | 0 0 0 1 | 0 0 | 1 |   |
| +3 | 0 0 1 1 0 0 | 0 0 0 1 | 0 0 | 1 |   |
|    | 0 0 1 0 1 1 | 0 0 0 1 | 0 0 | 0 |   |
|    | 0 0 1 0 1 0 | 0 0 0 1 | 0 0 | 0 |   |
|    | 0 0 1 0 0 1 | 0 0 0 1 | 0 0 | 0 |   |
| +2 | 0 0 1 0 0 0 | 0 0 0 1 | 0 0 | 0 | d/c |
|    | 0 0 0 1 1 1 | 0 0 1 0 | 0 1 | 1 |   |
|    | 0 0 0 1 1 0 | 0 0 1 0 | 0 1 | 1 |   |
|    | 0 0 0 1 0 1 | 0 0 1 0 | 0 1 | 1 |   |
| +1 | 0 0 0 1 0 0 | 0 0 1 0 | 0 1 | 1 | c |
|    | 0 0 0 0 1 1 | 0 0 1 0 | 0 1 | 0 |   |
|    | 0 0 0 0 1 0 | 0 0 1 0 | 0 1 | 0 |   |
|    | 0 0 0 0 0 1 | 0 0 1 0 | 0 1 | 0 |   |
| 0  | 0 0 0 0 0 0 | 0 0 1 0 | 0 1 | 0 |   |
|    | 1 1 1 1 1 1 | 0 1 0 0 | 1 1 | 1 | c/b |
|    | 1 1 1 1 1 0 | 0 1 0 0 | 1 1 | 1 |   |
|    | 1 1 1 1 0 1 | 0 1 0 0 | 1 1 | 1 |   |
| -1 | 1 1 1 1 0 0 | 0 1 0 0 | 1 1 | 1 | b |
|    | 1 1 1 0 1 1 | 0 1 0 0 | 1 1 | 0 |   |
|    | 1 1 1 0 1 0 | 0 1 0 0 | 1 1 | 0 |   |
|    | 1 1 1 0 0 1 | 0 1 0 0 | 1 1 | 0 |   |
| -2 | 1 1 1 0 0 0 | 0 1 0 0 | 1 1 | 0 | b/a |
|    | 1 1 0 1 1 1 | 1 0 0 0 | 1 0 | 1 |   |
|    | 1 1 0 1 1 0 | 1 0 0 0 | 1 0 | 1 |   |
|    | 1 1 0 1 0 1 | 1 0 0 0 | 1 0 | 1 |   |
| -3 | 1 1 0 1 0 0 | 1 0 0 0 | 1 0 | 1 | a |
|    | 1 1 0 0 1 1 | 1 0 0 0 | 1 0 | 0 |   |
|    | 1 1 0 0 1 0 | 1 0 0 0 | 1 0 | 0 |   |
|    | 1 1 0 0 0 1 | 1 0 0 0 | 1 0 | 0 |   |
| -4 | 1 1 0 0 0 0 | 1 0 0 0 | 1 0 | 1 |   |
|    | 1 0 1 1 1 1 | 1 0 0 0 | 1 0 | 0 |   |

*Fig.2*

INVENTOR.
DEREK J. HATLEY

Patented May 18, 1971

INVENTOR.
DEREK J. HATLEY

BY M. Lutucker ATTY

INVENTOR.
DEREK J. HATLEY

INVENTOR.
DEREK J. HATLEY

BY [signature] ATTY

INVENTOR.
DEREK J. HATLEY
BY [signature] ATTY

AUTOMATIC EQUALIZER FOR DIGITAL DATA TRANSMISSION SYSTEMS

The present invention relates to a system for varying the response of a data receiver for equalizing the distortion introduced by the data transmission channel, and particularly to an automatic serial digital equalizer which operates sequentially on the bits of digital messages representing the data signals so as to adapt such messages in a manner to correct the distortion introduced by the data transmission channel.

The invention is especially suitable for use in the receiving portion of a digital data modem (by which is meant a system for the transmission and reception of digital data) and insures data output having low error rates.

It is generally recognized that high bit rates over communication channels, such as telephone wire lines, is limited by the distortion introduced by the channel, as well as by other elements, such as transmitting and receiving filters. Techniques for automatically adjusting or equalizing the channel to compensate for such distortion which have been used in the past are described in considerable detail in an article by R.W. Lucky and H.R. Rudin entitled "An Automatic Equalizer for General Purpose Communication Channels" which appeared in the Bell System Telephone Journal, Nov. 1967, page 2179 et seq. This article describes an adaptive equalizer which is implemented by means of a transversal filter with weighted taps. The weights are attenuators which operate in parallel upon analog data signals. The attenuators are set by digital signals obtained from the analog signals by combining them, translating them into digital form and processing the digital information simultaneously and in parallel in a multiplicity of complex digital processes in accordance with a distortion reduction algorithm. While such equalizers may have rapid response, their complexity results in very high cost and their requirement for analog components reduces their reliability.

It has been found in accordance with this invention that an algorithm which results in reduction of distortion of data signals can be implemented by means of serial digital logic means when the input data signal is initially converted from analog to digital form. Accordingly, the invention has as one of its features the provision of continuous adaptive equalization of a data receiver solely through the use of digital techniques. A further feature of the invention resides in the facility to utilize serial logic whereby the elements necessary for the implementation of the distortion reduction algorithm may be time shared, thereby reducing the cost of the equalizer system. A further feature of the invention is that it facilitates the use of simplified digital logic which performs complex functions as multiplication and correlation.

It is therefore a principal object of this invention to provide an improved system for equalizing a communications channel so as to make it suitable for data transmission.

It is a further object of the invention to provide an improved automatic equalizer which adapts its characteristics sufficiently rapidly to respond to changes in channel characteristics during data transmission.

It is also an object of the invention to provide an improved automatic equalizer which can be implemented at lower cost than is the case for automatic equalizers which are presently known to exist.

Briefly described, an equalizer in accordance with the invention utilizes a signal memory in which a plurality of digitized words corresponding to the data signal are stored. Another similar memory is provided which has storage for a like number of digitized words representing weights. The data words are sequentially written into the signal memory and read out therefrom, whereby their spacial relationship remains fixed although they circulate in time. As the data words are read out of the signal memory, they are sequentially multiplied with correspondingly spacially located words in the weight memory. The sum of a plurality of the products of the weight and data words is accumulated. Preferably, the accumulator operates upon the bits of the data and weight words serially, such that the multiplication and addition may be facilitated with a minimum amount of logic. The digital data in the accumulator can be decoded to provide the equalized output data. The sense of error in the value of this data in the accumulator from its optimum value (viz. the sign of the error) is detected and applied to a correlator wherein it is sequentially correlated with the signs of successively selected data words from the signal memory. The correlator produces output bits which are applied to weight-adjusting logic which changes the weight words stored in the weight memory which correspond to the data words which are selected in a sense to eliminate any correlation between the error in the data words and the data words themselves. It has been found that the adjustment of the weight words causes the data stored in the accumulator to represent the data transmitted during each symbol period in equalized form, notwithstanding that the system operates entirely digitally and adjusts the weights in a sequential manner whereby the correlator operates on data relating to only one weight at a time.

The invention itself, both as to its organization and method of operation, as well as additional objects and advantages thereof will become more readily apparent from a reading of the following description in connection with the accompanying drawings in which:

FIG. 2 is a table representing the data words, both in analog and digital form, as well as the decision thresholds upon which the system shown in FIG. 1 operates;

Figure 1:
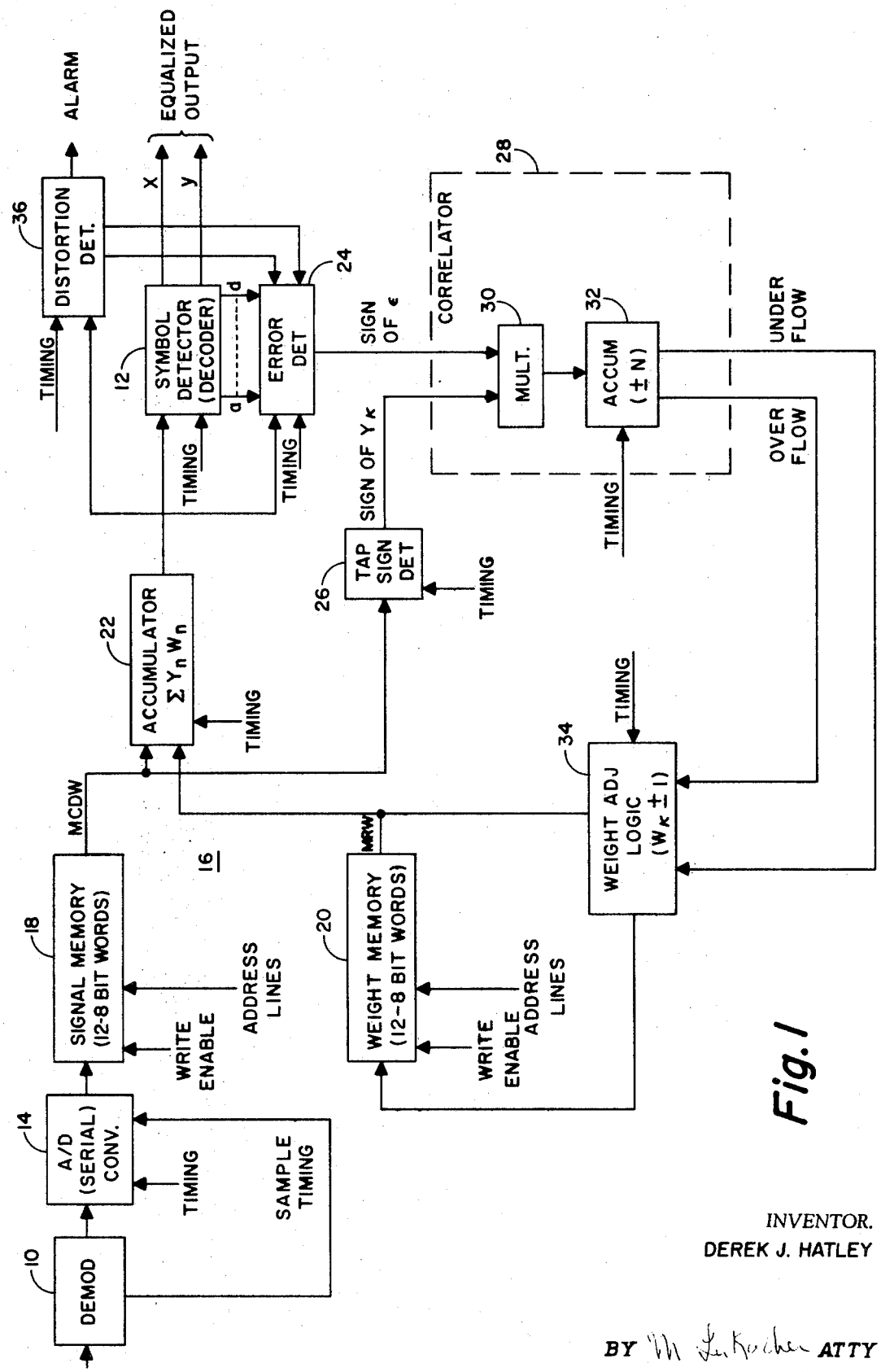
FIG. 1 is a block diagram of a portion of the receiving section of a data modem containing an equalizer system embodying the invention.

FIG. 1 shows the receiving section of a digital data modem having an adaptive automatic equalizer embodying the invention. This modem includes a transmitter section which converts serial digital data into analog form suitable for transmission over a channel, such as a wire line of the type conventionally used in dial-up telephone systems. The transmitted signals may be pulse amplitude modulated vestigial sideband signals. When these signals are received, they pass through suitable interface devices, as may include an automatic gain control circuit and filters and are applied to a demodulator unit 10 in the receiving section of a modem. The modem whose transmitting section generates the analog signal may be located remotely from the point where the signals are received, for example, at a remote data terminal or computer. The demodulator converts the vestigial sideband transmission into pulse amplitude modulated signals.

Consider that these pulse amplitude modulated signals are repetitive at a 2,400 pulse per second (PPS) symbol rate and are bipolar signals having four amplitude levels, each representing a pair of bits. The data rate is therefore 4,800 bits per second (bps). The receiving section converts the pulse amplitude modulated signal back to its original serial data form at the rate of 4,800 bps. This data output is available at the outputs $x$ and $y$ of a symbol detector 12 which forms part of the receiving section and plays a part in the automatic equalization technique which is practiced in accordance with this invention. In the event that the data is specially coded prior to transmission, say by a scrambler, a descrambler follows the symbol detector. Of course, interface equipment may follow the decoding equipment for applying the data to a computer input, data terminal or other utilization system.

The Data and Decision Threshold Table shown in FIG. 2 represents the levels of the pulse amplitude modulated signal in the left-hand column over the legend "analog. The output bits $x$ and $y$ are represented in a Gray code. The amplitude thresholds at which this code changes (relative) are +2, 0 and −2. These amplitude levels may be represented as $a, b, c$ and $d$, where '$a$' is less than −2, '$b$' is 0 to −2, '$c$' is +2 to 0 and '$d$' is greater than +2. It will be noted from FIG. 2 that there are distortion regions or "eyes" between levels $a$ and $b$, $b$ and $c$, and $c$ and $d$ and also at unusually large magnitudes of $a$ and $d$. Amplitude and phase distortion in the channel are reflected as variations in the pulse amplitude modulated signals, which when they cause the signals to lie in these "eyes," produce an uncertainty as to the veracity of the digital data output of the receiving section of the modem. The adaptive equalizer provided by the invention processes the received signals in digital form so as to insure that the signals do not lie in the distortion regions when decisions are made for conversion of the signals into output data.

The demodulator 10 also provides a sample timing pulse during, and desirably immediately before the end of each symbol period (viz. each 416⅔ microseconds). This timing pulse is applied to an analog-to-digital converter 12 which receives the pulse amplitude modulated signals from the demodulator and causes it to hold the digital representation of the level which was on its input at the time the sample pulse occurred. Also applied to the converter 12 are timing (clock) pulses which are obtained from a timing signal generator and have a very high repetition rate as compared to the symbol rate (e.g. 5 MHz). The digital data in the analog-to-digital converter is transferred to the output terminal of the converter under the control of this high-speed clock and in a manner suitable for use in the following units of the system, that is, in a serial digital code. Accordingly, there is a digital data word provided during each symbol period. This word may have eight bits. The eight bits represent the level of the pulse amplitude modulated signal which represents the pair of data bits transmitted during the symbol period. The automatic equalizer responds to these words and adapts the words by changing the values thereof so as to compensate and equalize the distortion introduced therein by the transmission channel.

The equalizer includes a transversal filter 16 made up of a signal memory 18 which has storage for 12 data words which are read serially into the memory from the A/D converter 14. The memory may consist of an array of 6 microcircuits, each having storage for 16 bits in a four-by-four matrix in the circuit. Thus, the 6 microcircuit devices store 96 bits in an eight-by-twelve matrix, eight bits in each column and 12 in each row. A column therefore has storage for a complete data word. The memory 18 has address lines to which timing pulses from the timing unit are applied, and a write enable line. The address lines go to each column and to each row of the matrix. Any bit may be selected for read out and will appear on the output line. A bit is written at the selected address when a write enable pulse is applied from the timing unit to the memory. Microcircuit memory devices which are suitable for use in the memory 18 may be the 9033 16-bit memory cells sold by the Fairchild Semiconductor Division of the Fairchild Camera and Instrument Corporation of Mountain View, California.

A weight memory 20 is also included in the transversal filter 16. The memory is identical to the signal memory in that it may be provided by an array of 6 microcircuit memory devices. There are therefore 12 storage locations or addresses for 12 eight-bit words, each corresponding to an address in the signal memory. The weight memory may have storage for longer words if greater resolution is desired. During each symbol period, the words in corresponding addresses in the signal memory and the weight memory are read out into an accumulator 22 where they are multiplied and the sum of all of the products of the data words $Y_{1112}$ and the weight words $W_{1112}$ is taken at the end of each symbol period. The accumulator provides at the end of each symbol period the sum of the products of the 12 data words and weight words. Thus, the data words going from the memory 18 to the accumulator are called the multiplicand word (MCDW) and the weight words going from the memory 20 to the accumulator are called the multiplier word (MRW). The multiplication and summation process is accomplished with a minimum of logic elements by virtue of the serial technique which is employed. The data output from the accumulator at the end of each symbol period represents the equalized data and is used in the symbol detector 12 to decode and obtain the values of the output bits transmitted during each symbol period. The accumulator itself will be described in detail hereinafter in connection with FIG. 4.

Figure 3:
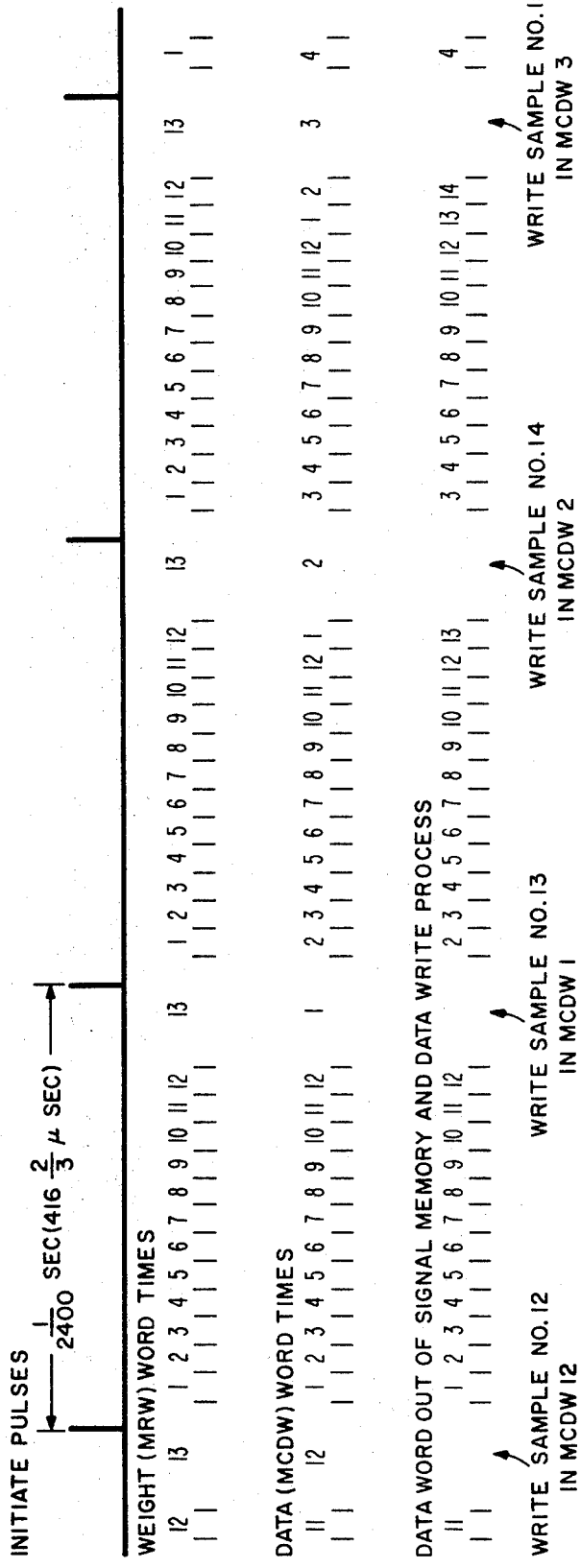
FIG. 3 is a timing diagram which illustrates the sequential circulation of the data words through the signal memory and the location of the weight words corresponding thereto.

Inasmuch as the memories 18 and 20 have fixed storage, the timing unit is operative to maintain the weight words in proper relationship in space in the memory with the data words to which they correspond in time. In other words, the timing is such as to permit the data words to slip in time one position during each cycle or symbol period. The timing diagram shown in FIG. 3 illustrates this operation. The initiate pulses generated by the receiver are separated by the symbol period. Note that there are 13 weight word timing intervals (1MRW to 13MRW) during which the memories 18 and 20 may be addressed, while there are only 12 locations or addresses for words in these memories. The 13th location, which occurs during the time of the initiate pulses is used to write new data in the appropriate address in the signal memory and to adjust the appropriate weight word in the weight memory 20. During the first symbol period, therefore, all of the bit locations in the weight memory and in the signal memory will be addressed sequentially and read out into the accumulator. The bits of the first data word $Y_1$ in memory 18 location 1 (e.g. column 1 in the matrix of memory devices) are read out together with the bits of first weight word $W_1$ in memory 20 location 1, the bits of the second data word $Y_2$ in location 2 with the bits of second weight word $W_2$ in location 2, and so forth, until all of the weight and signal memories are read out and the sum of the products of the data words $Y_1-Y_{12}$ and 12 weight words $W_1-W_{12}$ is obtained at the output of the accumulator. The accumulator output is read out during the 13th interval. During this interval also, a new data word (the 13th data word or sample as it occurs in time) is written into the first location in the memory 18. All the currently stored data words effectively therefore slip one word address relative to the weight words. During the next symbol period, the weight and signal memories are again addressed and read out sequentially but the data words now occur in the sequence 2, 3, 4, 5, 6, 7, 8, 9, 10, 11, 12, 1 whereas the weight words always occur in the sequence 1 through 12. The data word words will be weighted (viz. multiplied) with weight words having shifted positions in space with respect to the weight words. During this same symbol period in the 13th word time, the 14th data word (14th sample in time) is written into location 2 in the signal memory where it is in position to be weighted by the weight word for the newest data word (viz. the weight word in location 12 in the weight memory). Thus, the data words circulate in time with respect to the weight words while spacial positions in the data memory 18 are retained, thereby providing a serially or sequentially operative transversal filter.

The weight words are also adjusted or adapted to accommodate for the distortion in the channel during the 13th time interval. The weight word selected for adjustment and the sequence in which the weight words are adjusted may be selected in accordance with the characteristics of the channel involved. It has been found that one weight contributes most significantly to the gain adjustment of the channel. This weight is referred to as the main tap weight. It is desirable to adjust this weight first during the transmission of a preamble at the start of each transmission. Accordingly, several seconds may be allowed for this preamble, a portion of which, say about one-half second is allocated to the adjustment of the main tap weight word. It has been found desirable to transmit two-level instead of four-level PAM signals during a portion, say about 2½ seconds of this preamble during which the main tap weight word and then the secondary tap weight words are coarsely adjusted. The preamble concludes with a sequence of four-level signals after which the channel is substantially equalized. The equalizer has the facility to select the main tap weight word for initial adjustment. For example, this weight word may be the one located in spacial position 7 in the weight memory 20. The weight memory may initially be reset (i.e. all of the weight words having an analog equivalent value of zero, except for the word in weight memory location 7 which is set to a digital value +1). As the data words are sequentially read from the signal memory, the accumulator 22 would provide an output at the end of each symbol period corresponding to the data word having the same positional relationship in the signal memory as the main tap weight word has in the weight memory. Accordingly, the output of the accumulator will correspond identically to the data word. If there is no distortion, there will be no average error detected by the adaptation elements of the equalizer system. If an error is detected, an output will be provided for adjustment of the main weight during the 13th time interval (viz. 13MRW). After the symbol periods allocated to main weight adjustment have elapsed and assuming that no alarm is produced to indicate that the distortion of the signal is nevertheless outside of limits, the weight words may be adjusted in selected sequence. This sequence may correspond to the order in which the weight words are located in the weight memory 20 (viz. $W_1-W_{12}$) for the sake of simplicity of the equipment necessary for weight word adjustment.

The symbol detector and decoder 12 examines the sum stored in the accumulator 22 at the end of each symbol period. Only the highest order bits are required for symbol detection. These bits are indicated as $P_{15}$ to $P_{10}$ in the second column of the Data and Decision Threshold Table (FIG. 2). It will be noted that the bits will correspond to the bits $A_s$ (the sign bit) and $A_7$ through $A_3$ of the data word stored in the signal memory word location corresponding to the location of the main weight word in the weight memory when the weight memory is reset. While there are 16 locations in the accumulator, the highest order location $P_{16}$ is not used in decoding, since with normal operations it is identical to the next highest order bit $P_{15}$.

The symbol detector 12 decodes the sum in the accumulator 22 to provide the outputs $a$, $b$, $c$, and $d$ and equalized outputs $x$ and $y$. The decoding process is accomplished in accordance with the codes shown in the second, third and fourth column of the table in FIG. 2. The decoded bits are applied to an error detector 24 together with the four highest order bits $P_{15}-P_{12}$ of the digital word stored in the accumulator. A comparison is made in the error detector so as to allocate the sum to one of the levels $a$, $b$, $c$ and $d$ which, as mentioned above, corresponds to the different analog values of the data signal. The error detector provides an output representing the sign of the error depending upon which side of the center of the levels $a$, $b$, $c$ and $d$, the sum in the accumulator 22 is located. Thus, if the sum word $P_{15}$ to $P_{12}$ has a code lying in level $b$, the sign of the error is positive and is represented by a "1" bit if $P_{15}-P_{12}$ is 1111, while the sign of the error is negative and represented by "0" bit, if $P_{15}-P_{12}$ is 1110. Since only a change in one bit indicates the change in error sign, the serial logic for detecting errors may readily be implemented. This relationship is shown for each of the levels $a$, $b$, $c$ and $d$ in the table of FIG. 2. Thus, during the thirteenth interval in the timing cycle (see FIG. 3), an output is provided from the error detector representing the sign of the error $\epsilon$.

Adaptive control of the weight words is accomplished by correlating this error sign output with the sign of the data word in the signal memory corresponding in position to the weight word in the weight memory 20 which is subject to adjustment.

It has been found in accordance with the invention that only the sign of the error which is represented by the output of the error detector 24 need be correlated with the sign of the data word in order to adapt the system to equalize the channel. Since each weight word may be considered to be effectively located at a tap of the effective transversal filter provided by the signal memory 18, the data word at the tap or location of the weight word in the weight memory 20 which is subject to adjustment is applied to a tap sign detector 26 which reads the value of the appropriate weight word, indicated as $Y_k$ in FIG. 1, and produces as the output bit a bit representing the sign of $Y_k$. The bits representing the sign of $Y_k$ and the sign of $\epsilon$ are applied to a correlator 28. This correlator includes a multiplier 30 which effectively multiplies the $S_k$, representing the sign of the data word $Y_k$, and Z, representing the sign of $\epsilon$, and produces an output which is again either a 0 or a 1 bit (viz. the output represents the function $Z\overline{S}_k+S_k\overline{Z}$) depending upon the sense of the correlation. If there is no correlation (viz. no distortion) the average of these outputs will be zero. The multiplier output is produced during the 13th word time and occurs once during each symbol period. The correlator 28 includes an accumulator 32 which provides the necessary averaging. The accumulator may, for example, be a bidirectional counter which counts in one direction for correlation outputs in one sense, say positive, and in the opposite direction for correlation in the opposite sense, say negative. Two outputs are provided by the accumulator, one on an overflow line and the other on an underflow line, when the value of the count in the accumulator 32 reaches a certain threshold +N. This threshold may be variable and set to a lower number in the case of the weight word adjustment during a portion of the preamble. A suitable threshold for the early preamble portion may be 4, during steady state operation, the threshold may be 22.

A predetermined number of symbol periods are allocated to the adjustment of each weight; preferably, a lower number during the preamble than for the adjustment during steady state operation. Assume that 62 symbol periods are allocated for the adjustment of each weight word. Assume further that the threshold number +N for providing an output on either the overflow or underflow lines is 22. Thus, when +22 is stored in the accumulator 32, a "1" bit is read out on the overflow line. This bit is applied to weight adjustment logic 34 which includes an adder for adding a "1" bit in the least significant position to the weight word for the tap being adjusted. For example, for main tap adjustment, the main tap weight word will be read out into the weight adjustment logic during the interval for read out of that word into the accumulator 22. In the 13th word time 13MRW during each symbol period, the bits of the main tap word are addressed in the weight memory and that word is updated. Inasmuch as 64 symbol intervals are available for main tap weight word adjustment and outputs from the correlator 28, the main tap weight word may be changed twice during the time allocated for the adjustment of that word. Since the weight words are adjusted during the 13th interval, they may be selected for adjustment in any sequence by properly timing the enabling of the tap sign detector 26 and the weight adjusting logic 34 (viz. $W_7$, $W_6$, $W_8$, $W_5$, $W_9$, $W_4$, $W_{10}$, $W_3$, $W_{11}$, $W_2$, $W_{12}$, $W_1$), or in order of their location in memory, as discussed above.

In cases where the distortion of the data words is maintained outside the limits for a long period of time, an alarm is provided by means of a distortion detector 36. This distortion detector includes a decoder which provides an output pulse during each symbol period if the equalized signal as represented by the sum word $P_{15}-P_{10}$ in the accumulator 22 falls within a distortion region, such as the "eyes" a $b/a$, $c/b$ and $d/c$, as shown in the table of FIG. 2 or is below region a or above region $d$. For example, if $P_{15}-P_{10}$ is 111000, an output pulse is provided which may be applied to a counter in the distortion detector which is reset, say every 10 seconds. When a predetermined number of pulses are produced during such 10 second time interval, it is taken to indicate that distortion of the signal is not tolerable to the extent that the equalized output is correct to the necessary degree of certainty. Accordingly, the distortion detector 33 produces an alarm. Alternatively, the distortion detector could be connected to the output of the correlator 28 and count the number of overflow and underflow bits. If this number exceeds a preset threshold number during a predetermined number of symbol periods, an alarm could be indicated.

Figure 4:
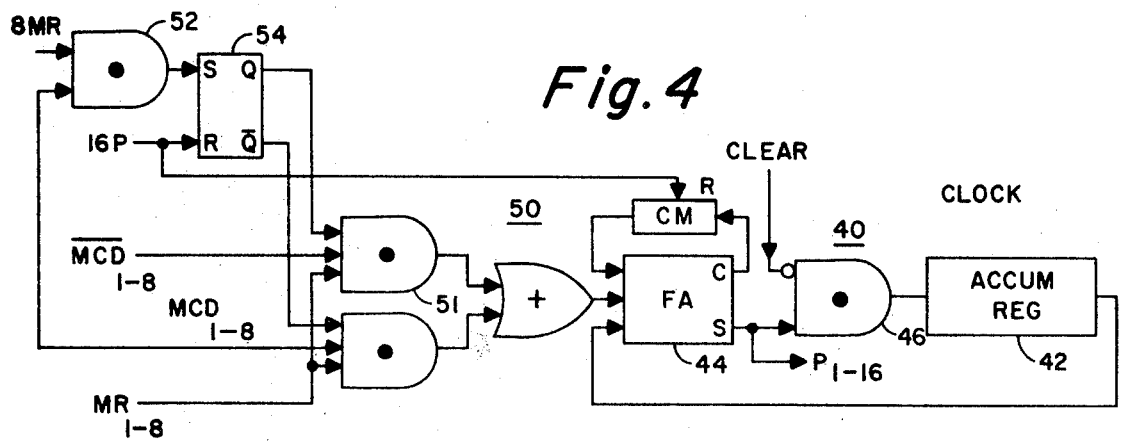
FIG. 4 is a simplified block diagram of the accumulator shown in FIG. 1.
Figure 5:
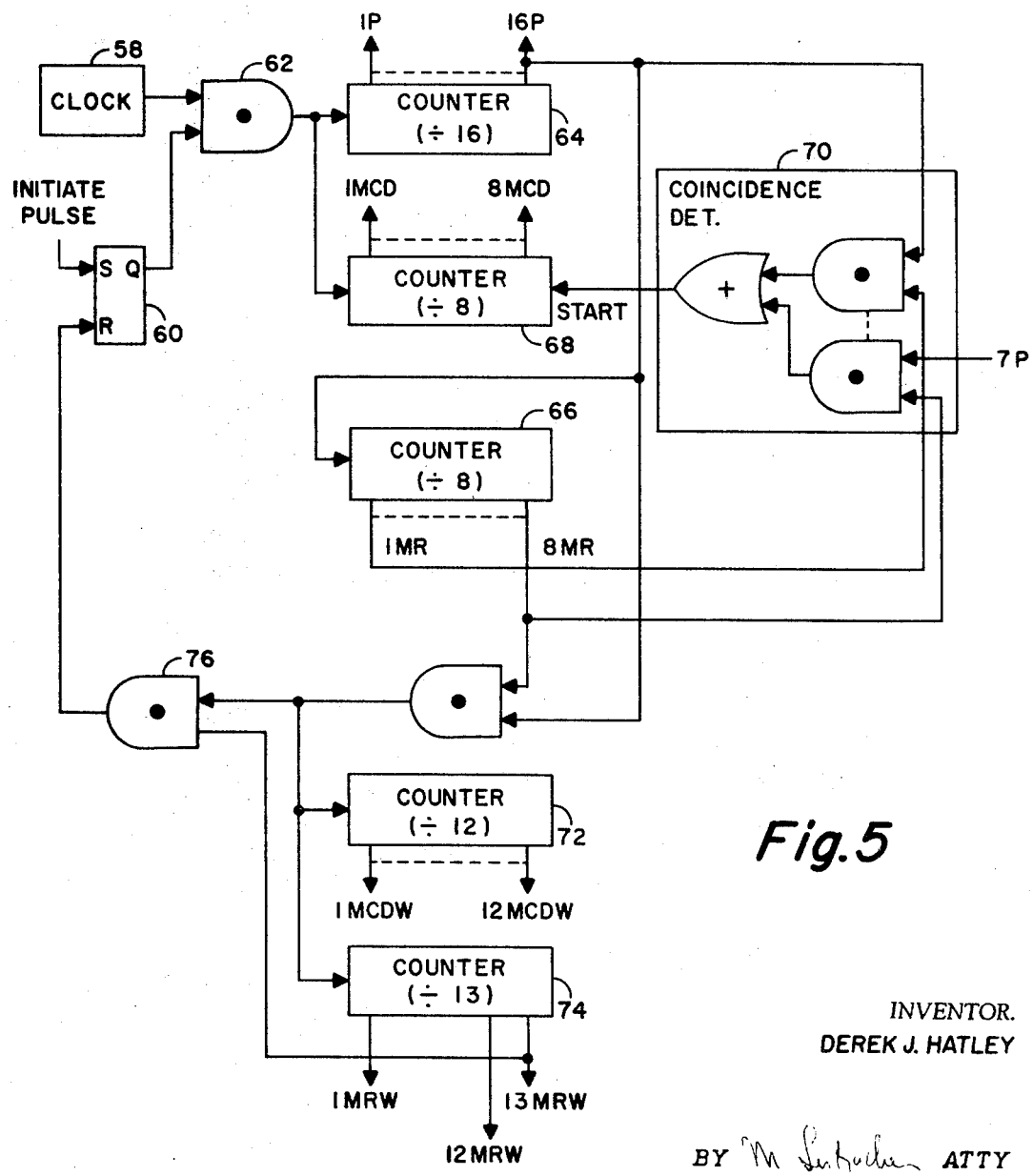
FIG. 5 is a simplified block diagram of the timing unit which provides timing pulses for operating the system shown in FIG. 1.

The accumulator 22 is shown in detail in FIG. 4. Its operation will be considered in connection with the Table of FIG. 7 and the diagram showing the timing unit which is depicted in FIG. 5. The accumulator includes a serial adder 40 made up of an accumulator register 42 to which data is fed from a full adder 44 via an AND gate 46. The full adder 44 also includes a carry memory 48 such as a flip-flop. The data to be multiplied and added is applied to the full adder 44 via gates 50. This data is obtained by serial readout of the signal and weight memories 18 and 20 by the timing unit. The data bits from the signal memory constitute the multiplicand. In this illustrated system, there are 8 such data bits and they arrive on data input lines to the gates 50 indicated as $MCD_{1-8}$ and $\overline{MCD}_{1-8}$. The multiplier data bits labeled $MR_{1-8}$ are also applied to inputs to the gates 50.

The accumulator utilizes 2's complement arithmetic in order to provide for the multiplication of negative multipliers. Reference may be had to FIG. 2 which illustrates that the sign bit of negatively valued data is a binary "1." An AND gate 52 to which a timing bit which is coincident with the most significant multiplier bit and the multiplicand data bit is used together with a flip-flop 54 to input the 2's complement of the multiplicand word when it is multiplied by a negative multiplier word.

Consider next the timing unit shown in FIG. 5. Reference may also be had to the timing diagram of FIG. 6 which shows only a portion of the one symbol interval. This symbol interval starts with the initiate pulse which sets a flip-flop 60 such that an AND gate 62 is enabled and the high frequency clock pulses pass to the input of a recirculating (ring) divide-by-16 counter. During each cycle of 16 states, the counter 64 produces a sequence of 16 timing pulses, 1P to 16P. At the end of each cycle of the counter 64, a pulse is applied to the input of a ring counter 66 which counts to 8 and then recycles. This counter 66 provides the multiplier bit-timing pulses 1MR–8MR which are used for addressing the weight memory 20 and for other timing purposes. As shown in the timing diagram, the multiplier bit-timing pulses 1MR to 8MR each occur during a successive count cycle of the counter 64.

The counter 64 will be referred to as the product counter, inasmuch as the timing pulses 1P to 16P will be coincident with the data bits which are available at the output of the serial adder 40 (viz. at the sum output of the full adder 44, FIG. 4).

The multiplicand timer is provided by a counter 68 to which the clock pulses pass from the AND gate 62. The counter stops at a count of 8 and does not restart until a start pulse is applied thereto from a coincidence detector 70. The coincidence detector includes 8 AND gates to the first of which the 16th timing pulse is applied and to the last of which the seventh product timing, pulse 7P is applied. The first of these AND gates also has the first multiplier bit-timing pulse MR applied thereto while the last receives the 8MR timing pulse. Accordingly, during the first cycle (viz. the first multiplier bit time), a start pulse will be applied to the multiplicand timer 68 at the beginning of the first multiplier bit time. The clock pulse to be counted will then be coincident with the first P pulse (1P) from the product timer 64. During the next cycle of the product timer, however, the start pulse to the multiplicand timer 68 will be coincident with the second product timing pulse 2P which occurs during the second multiplier bit time 2MR. The first clock pulse to be counted will be that one which occurs immediately after the start pulse. Therefore, the first multiplicand bit time will be coincident with the 1P pulse from the product timer 64. The second time the multiplicand timer starts the count will be coincident with the 2P pulse and so forth. The multiplicand bit-timing pulses 1MCD to 8MCD are available from the outputs of the counter 68. This timing permits digital multiplication by a shift and add process in the system shown in FIG. 4, as will be apparent from FIG. 7.

Figures 6, 7:
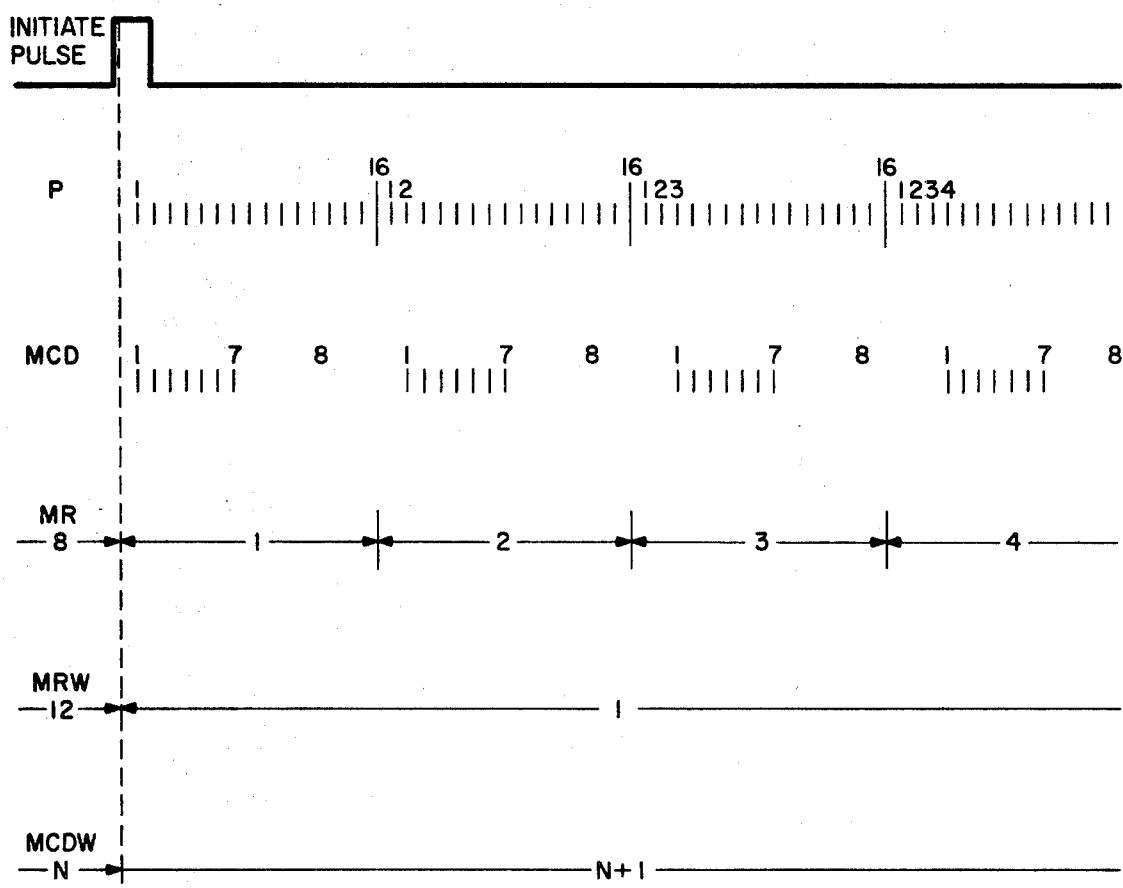
FIG. 6 is a simplified timing diagram which illustrates the operation of the timing unit shown in FIG. 5.
FIG. 7 is a table representing the timing and arithmetical operations of the accumulator shown in FIG. 4.

FIG. 7 shows the multiplication of a positive multiplicand word MCDW1 and a positive multiplier word MRW1, each having 8 bits. During the first multiplier bit time, the bits of the multiplicand word are read out coincidentally with the product timer pulses 1P through 8P (viz. $MCD_1$ to $MCD_8$ are coincident with 1P through 8P). During the next multiplier bit time, the multiplicand word is effectively shifted in time by one product timing pulse interval. It will be observed that the multiplicand bit time 8MCD continues in duration to the end of the product timer cycle (viz. to the time of occurrence of 15P). Accordingly, the most significant bit $8_S$ (the sign bit) continues to be read into the adder 40. Zero bits are read into the adder 40 until the first multiplicand bit time. The latter conditions are illustrated in FIG. 6 which shows the varying duration of the eighth multiplicand bit time 8MCD and the delayed start of 1MCD during each product timer cycle. At the end of 8 product timer cycles (viz. at the end of 8 multiplier bit times), the entire first multiplier word MRW1 will have been multiplied by the entire first multiplicand word MCDW1 and this sum will be stored in the accumulator register 42 (FIG. 4).

It will be assumed that the next multiplier word MRW2 has a negative value (viz. its most significant bit or sign bit $8_S$ is a binary "1" (see FIG. 2). Addition of the 2's complement of the shifted multiplicand into the accumulator register 42 will effectively subtract the product of the second multiplier word MRW2 and the second multiplicand word MCDW2 from the sum then stored in the accumulator register 42. The AND gate 51 in the gates 50 (FIG. 4) which passes the complement of the multiplicand data bits, $MCD_{1-8}$ is enabled during the eighth multiplier bit time (8MR), one multiplicand bit time after the first multiplicand bit which is a binary "1." The delay of 1 bit time is due to the flip-flop 54. Thus in the example shown in FIG. 7, during the 8th bit time for $MRW_2$, if $MCD_1$ is a binary "1," the AND gate 51 will be enabled so as to pass each $MCD_{2-8}$. Note that this AND gate 51 is enabled only if $MR_8$ in MRW 2 is a binary "1" corresponding to 2 negative multiplier word (see FIG. 2).

The system may be modified by providing a weight memory for longer multiplier word (multiplier words having more than eight bits). In that event, the multiplier bit timer 66 (FIG. 5) will have the capacity to count up to the total number of bits in each multiplier word. Additional AND gates would then be provided in the coincidence detector 70 and will receive inputs the 8P and 9MR, 9P and 10MR, and so forth, such that the multiplicand data word would be read out of the signal memory 18 with a further left shift. The accumulator register 42 and the capacity of the product timer 64 would also be enlarged accordingly.

Inasmuch as there are 12 multiplier and multiplicand words in the memories 18 and 20, the process described above is repeated 12 times during each symbol interval. It will be recalled from the discussion of FIG. 3 that 13 multiplier word times are provided for each 12 multiplicand word times. To this end, a multiplicand word timer is provided by a counter 72 having 12 states, while the multiplier word timer is provided by a counter 74 having 13 states. Pulses for advancing these counters occur at the end of each multiplier word time (viz. when 16P occurs during 8MR). At the end of the 13th multiplier word time, an AND gate 76 is enabled which resets the flip-flop 60, thereby inhibiting the flow of clock pulses to all of the counter timers. The system then remains at rest until the next initiate pulse at the beginning of the next symbol interval.

FIG. 6 also shows a portion of the 12th and first multiplier word times and a portion of the Nth and (N+1) multiplicand word times. The processing of only a little more than 3 bits of the first multiplier word MRW1 and the (N+1) multiplicand word MCDW(N+1) occurs during the time period illustrated in FIG. 6. As mentioned above, in the illustrated system wherein each multiplier word has eight bits, this multiplier bit and multiplicand bit-multiplying process repeats serially until all 12 multiplicand words are multiplied with their corresponding 12 multiplier words. This serial processing provides the features of economy and reliability.

Figure 8:
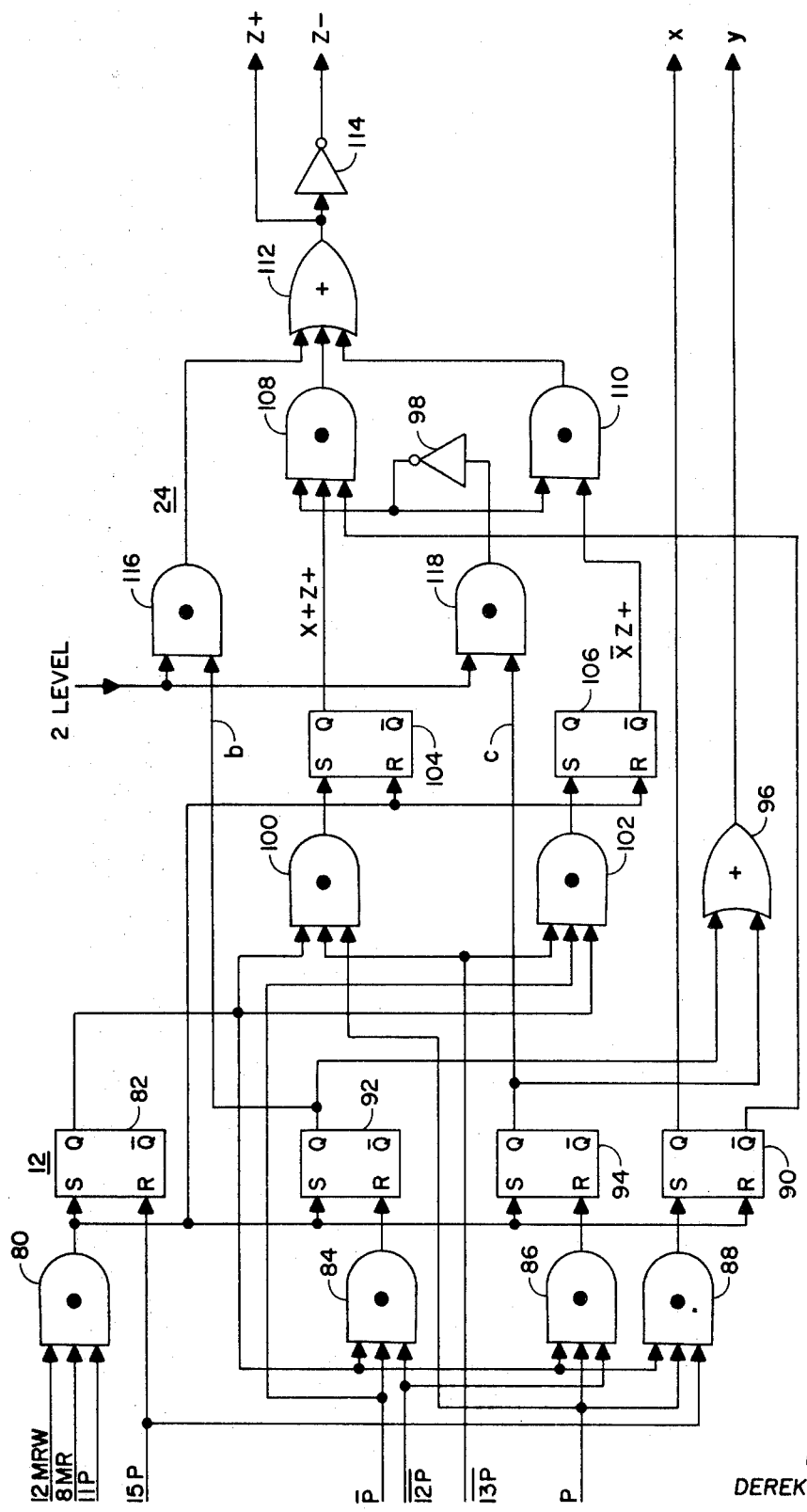
FIG. 8 is a simplified block diagram of the symbol detector and error detector shown in FIG. 1.

The symbol detector 12, which decodes the sum stored in the accumulator 22, is shown in FIG. 8. A decode timer, including an AND gate 80 and a flip-flop 82, enables the symbol detector during the time when the most significant bits $P_{15}$ through $P_{12}$ are read out of the adder 44 (FIG. 4) during the 12th multiplier word time. In other words, the flip-flop 82 is enabled from the 12th through the 15th product bit times. Note the delay of one bit time is due to the delay required to set the flip-flop 82. The data bits from the product accumulator 22 arrive at the inputs of three AND gates 84, 86 and 88. The logic upon which these gates operate to decode the sum of the product stored in the accumulator so as to obtain the bits $x$ and $y$ which are transmitted will be apparent from the Table of FIG. 2. Thus, the value of the $x$ bit will always follow the most significant bit $P_{15}$. The AND gate 88 is enabled if P is a "1" bit during the 15th product bit time. This will cause a flip-flop 90 to be set. If the data stored in the accumulator falls into regions $b$ or $c$ and the $P_{15}$ bit is a "1," the output $y$ bit is a "1." The data is in region $b$ if $P_{15}$, $P_{14}$ and $P_{13}$ are all "1" bits. Gate 84 is enabled only during the 13th 14th and 15th product accumulator bit readout times by virtue of the application thereto of the 12P timing pulse. If any of the three most significant P bits is a "0," that bit will pass through the gate 84 and reset a flip-flop 92. The Q output of this flip-flop is then a "1," if the data is in region $b$.

The AND gate 86 operates in a manner similar to the gate 84 and causes a flip-flop 94 to be reset, if the data is not in region $c$. Inasmuch as one of the flip-flops 92 and 94 will be set when the data is in region $b$ or $c$, an OR gate 96 will produce the $y$ bit (viz. $y=b+c$).

The remainder of the logic shown in FIG. 8 provides the error detector 24 which produces two outputs Z+ or Z− indicating the sign or the error. A Z output is produced each symbol period. It will be noted from the Table of FIG. 2 that the bits $P_{12}$, $P_{14}$ and $P_{15}$ uniquely define the sign of this error. In regions $a$ and $b$, the sign of the error is positive, if $P_{12}$, $P_{14}$ and $P_{15}$ are all "1" bits, while it is negative if any of them is an "0" bit. In regions $c$ and $d$ the sign of the error is negative if $P_{12}$, $P_{14}$ and $P_{15}$ are all "0" bits, otherwise it is positive. These decisions are made by the AND gates 100 and 102 which are enabled to pass the $P_{12}$, $P_{14}$ and $P_{15}$ data bits from the accumulator 22 during the 12th multiplier word time. The gate 100 passes the bits themselves, while the gate 102 passes the complement of the bits. Accordingly, the flip-flop 104 will remain reset only if the $P_{12}$, $p_{14}$ and $P_{15}$ bits are "0." This is the case when the data is in regions $c$ or $d$ and the sign of the error is negative. Similarly, the flip-flop 106 will remain reset, if the data is in regions $a$ and $b$ and the error has a positive sign. The decoded $x$ bit determines whether or not the data is either in regions $a$ or $b$, or in regions $c$ or $d$. If the $x$ bit is a "1," and flip-flop 106 is set, the sign of the error must be negative. A positive error sign is determined by an output from the flip-flop 104 in the event that the decoded data bit $x$ is a "0." The AND gates 108 and 110 make this decision. If either of these AND gates provides an output the sign of the error is positive (Z+), otherwise it is negative. The OR gate 112 and the inverter 114 provides these sign of error outputs. It will be recalled that during part of the preamble the data is two level PAM signal rather than a four level signal. If two level data is being transmitted, the gates 116 and 118 are enabled. If the data falls in region $b$, the gate 116 provides an output which indicates that the sign of the error is positive. The sign of a two level signal error is negative if it falls in region $c$. In that event, the gate 118 and inverter 98 will be enabled and will cause gates 108, 110 and 112 to have a "0" state.

The error sign outputs are retained during the 13th multiplier word time by virtue of the temporary storage in the flip-flops of the symbol detector 12 and the error sign detector 24.

Figure 9:
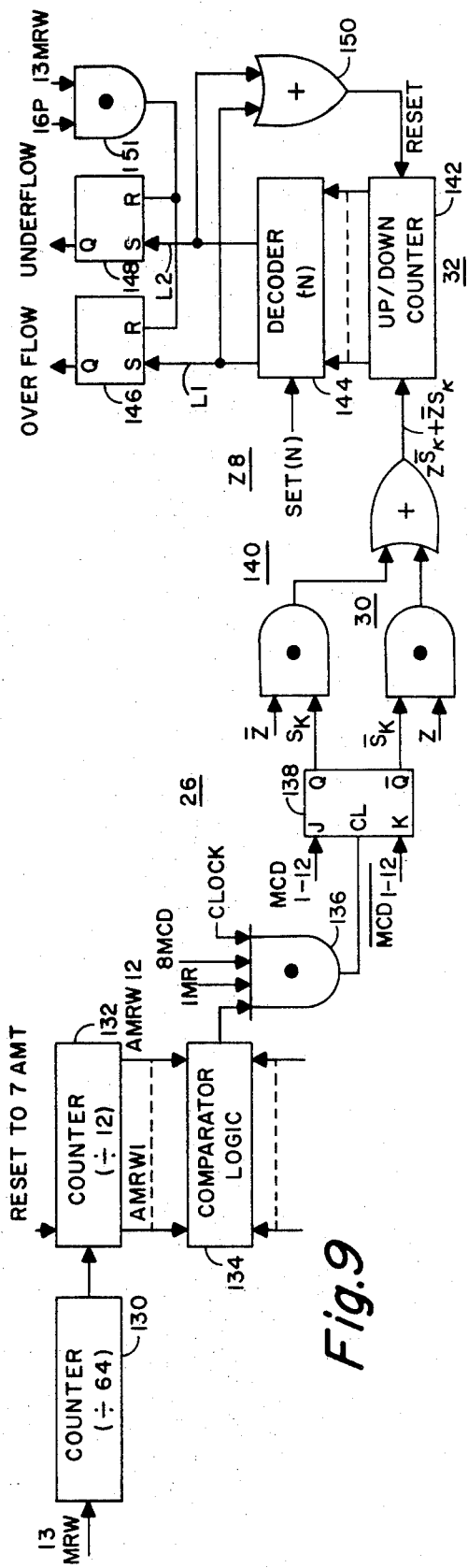
FIG. 9 is a simplified block diagram of the correlator and the input systems which input error and data information thereto, all of which are shown in FIG. 1.

The tap sign detector 26 and the correlator 28 are shown in FIG. 9. The tap sign detector includes a code generator which provides different codes for each of a predetermined number of symbol intervals; each code corresponding to the particular weight word to be adjusted. This code generator includes a recirculating counter 130 which is indicated to divide by 64. The 13th multiplier word timing pulse is counted by this counter. Accordingly, a count is registered during each symbol interval and outputs from the counter appear every 64 symbol intervals. This means that 64 symbol intervals are allocated for adjustment of each weight word. During preamble, it may be desired to reduce the divisor (viz. reset the counter 130) so that it divides by a lower number, say 32. The output of the counter 130 drives another counter 132 which may be a ring counter and which divides by 12. The outputs of this counter are AMRW1 through AMRW12 and constitutes the code designating the weight word to be adjusted. A different combination of these outputs is provided for each count registered in the counter 132 as it cycles through its 12 states. Thus, an output appears on AMRW1 for the first 64 symbol intervals, AMRW2 for the next 64 symbol intervals, and so on. The counter 132 may be reset to seven when the main tap weight word is selected for adjustment. Then an output will be provided on AMRW7. Comparator logic 134 which may be similar to the logic used in the coincidence detector 70 (FIG. 5), provides an output upon occurrence of the multiplier word time interval corresponding to the selected weight word. In other words, during 1MRW an output pulse will be provided from the comparator logic 134, during the first multiplier word time.

An AND gate 136 and JK flip-flop 138 select the sign bit (viz. the most significant bit) of the data word corresponding in location to the weight word to be modified. The AND gate 136 is enabled during the most significant multiplicand or data bit time by the bit-timing pulse 8MCD. The first multiplier bit-timing pulse is also applied to the gate 136, since it is desired to provide only one output during each multiplier word time. It will be recalled that there are eight repetitions of the multiplicand word or data word during each multiplier word and only one for each multiplier bit. The weight word which is selected for adjustment occurs during the time interval that the comparator logic 134 produces an output. The three outputs (comparator logic 134 output, 1MR and 8MCD) then enable the gate 136 to pass a clock pulse. The "1" and "0" data readout lines from the signal memory 18 ($MCD_{1-12}$ and $MCD_{1-12}$) are respectively applied to the J and K inputs of the flip-flop 136. The value of the most significant bit of the data word corresponding to the weight word to be adjusted will appear at the JK inputs of the flip-flop 138 during the clock pulse time. Accordingly, the flip-flop 138 will be set or reset depending upon whether the sign is "1" or "0."

An exclusive OR gate 140 made up of two AND gates and an OR gate effectively multiply the sign of the data with sign of the error to provide an output which is a "1" or "0" depending upon the sense of the correlation of the error and the stored data.

An up-down counter 142 provides the accumulator of the correlator 28. This up-down counter is read out by a decoder 144 which may be set to decode a predetermined number of counts and provide an output on line L1 for N "1" pulses stored in the counter 142 or on another line L2 for the same number N of "0" pulses which are stored in the counter 142. A suitable number of N during steady state operation may be 22. During the preamble, this number may, however, be much lower, say 4. When the decoder 144 provides an output, it stores it in either an overflow flip-flop 146, or an underflow flip-flop 148. Upon storage of the decoded count, the counter 142 is reset via an OR gate 150. The underflow flip-flops 146 and 148 are reset at the end of each symbol interval (viz. by an AND gate 151 enabled by the 16P timing pulse which occurs during 13MRW). With a decoding value of 22, the decoder 144 can provide two outputs during a 64 symbol interval period, which is allocated for adjustment of a single weight word. This corresponds to a change in the weight word of two. Larger amounts of adjustment may be provided if desired. For example, during adjustment of the main tap weight word, the decoding number fed into the decoder 144 may be 4. This provides a greater rate of adjustment.

Figure 10:
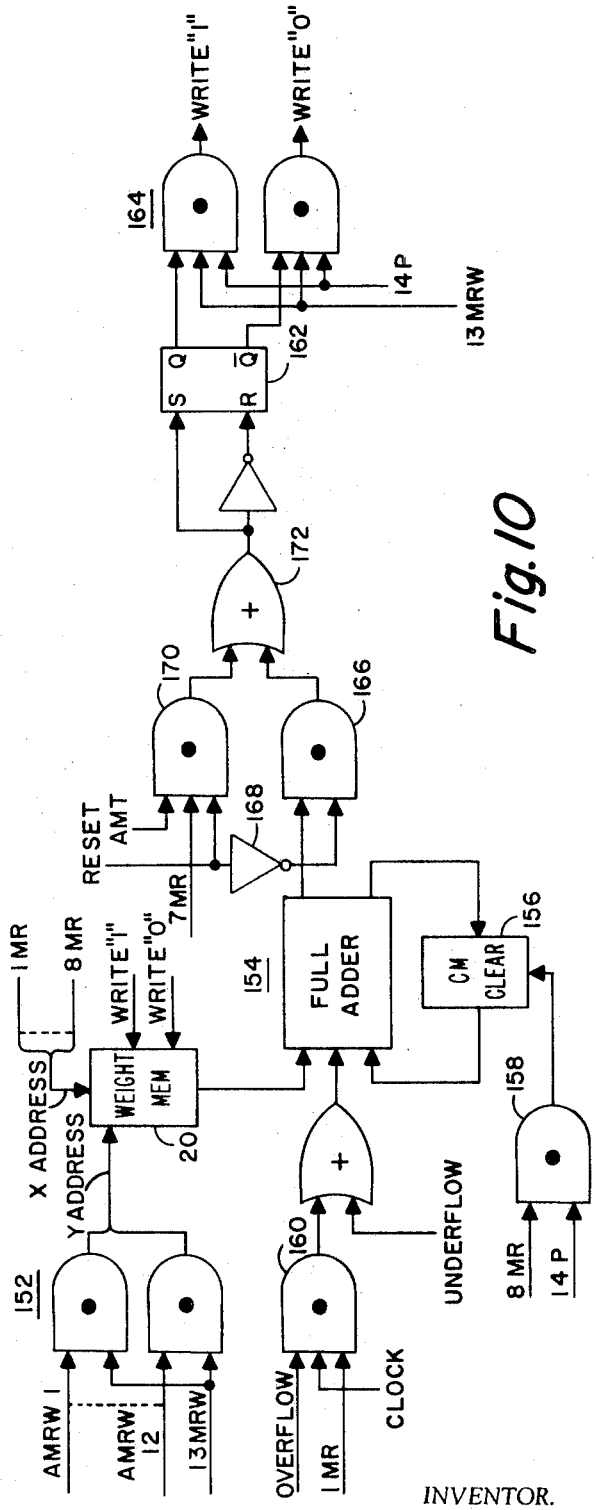
FIG. 10 is a simplified block diagram of the weight-adjusting logic shown in FIG. 1.

The weight adjustment logic is shown in FIG. 10. Adjustment is accomplished during the 13th multiplier word time. During this time, the weight memory 20 is addressed to select the weight word being adjusted. The selection is made by the code generator counter 132 which produces an output on one of the AMRW1 to AMRW12 input lines to an AND gate 152 connected to a different y or word address line of the weight memory 20. The memory 20 is read out serially bit by bit by the multiplier bit-timing pulses which are applied to the x address lines of the memory 20. Accordingly, during the 13th multiplier word time, the weight word to be adjusted is read into a full adder 154 which is initially cleared by the 8MR and 14P timing pulses applied to the carry memory 156 thereof via an AND gate 158. When an overflow output appears, it is read into the input of the full adder 154 via an AND gate 160 which is enabled during the first (least significant) multiplier bit time. The sum output of the adder 154 is stored in a flip-flop 162 on a bit by bit basis (viz. MR1 through MR8). These bits are written back into the memory upon occurrence of each of the 14P pulses during the 13th multiplier word time. A pair of AND gates 164 are enabled during these time periods so as to successively write the bits of the adjusted weight word back into memory.

An underflow requires a subtraction. This is accomplished by 2's complement addition; a string of 1's being written into the full adder during the presence of an underflow output.

When the system is to be reset, all of the weights are set to "0." This is accomplished by inhibiting the output of the full adder 154 at an AND gate 166 by a reset level which is applied thereto via an inverter 168. The flip-flop 162 is then reset and a string of "0"s is written into the weight memory for each weight word.

Another AND gate 170 is provided for setting the main tap to one, by the address main tap timing pulse. The gate passes an output during the most significant bit time 7MR of the multiplier word which occurs during the main tap word. This bit timing pulse passes through the OR gate 172 and sets the flip-flop 162. Accordingly, the seventh bit of the multiplier word in the main tap position is written as a "1," while all the other bits in all the other words are written as 0's.

From the foregoing description, it will be apparent that there has been provided an improved equalizing system especially suitable for high-speed data reception. The system has features of simplified logic elements, serial operation and therefore reduction in parts and implementation exclusively with digital logic elements. While an illustrative system has been described and specific values of numbers, thresholds and signal levels have been mentioned, this has been done principally to more clearly explain the invention. Variations and modifications of the herein described system may, of course, suggest themselves to those skilled in the art. The foregoing description should be taken as illustrative and not in any limiting sense.

I claim:

1. A system for correcting distortion of signals having expected values representative of different symbols which are transmitted over a channel in successive intervals, which system comprises:
   a. first means having storage for first multibit digital words corresponding to a plurality of said signals;
   b. second means having storage for a plurality of second multibit digital words corresponding to said stored first words; and
   c. means for processing said first and second words sequentially on a bit-by-bit basis and for adjusting said first words in accordance with the values of said second words and for adjusting the values of each of said second words in accordance with the deviation between the values of said adjusted first words and their expected values.

2. The invention as set forth in claim 1 including means for reading the bits of each of said words in said first and second storage means out successively into said processing means during each of said successive intervals.

3. The invention as set forth in claim 2 including means operative during each of said intervals for replacing digital words representing signals transmitted during such intervals each in consecutively spaced locations in said first storage means, said second words being disposed in the same order in consecutively spaced locations in said second storage means, means for reading said second words out of said second storage means in sequence corresponding to the order of their storage therein during each of said intervals, and means for reading said first words out of said first storage means in sequence corresponding to the order of their storage therein starting with successively higher order ones of said first words during successive ones of said intervals.

4. The invention as set forth in claim 3 wherein said first and second storage means each includes a plurality of memory elements, the elements in said first storage means being in corresponding relationship to the memory elements in said second storage means, each element having storage for a different bit of said words.

5. A system for equalizing a transmission channel, which system comprises:
   a. means for storing a plurality of data words respectively corresponding to signals transmitted over said channel at successive times;
   b. means for storing a like plurality of weight words each corresponding to a different one of said data words;
   c. means for accumulating a sum word from the sum of the products of said corresponding data and weight words;
   d. means for decoding said sum word into a symbol word representing the signal transmitted at each of said successive times;
   e. means responsive to said sum word for detecting the sense of the error in said sum word and providing at least one bit representative thereof;
   f. means responsive to one of said data words and said error bit for providing outputs indicating the presence and absence of correlation therebetween; and
   g. means for adjusting the one of said weight words which corresponds to said one data word in a sense to reduce the error in said sum word.

6. The invention as set forth in claim 5 wherein said signals which are transmitted over said channel are analog signals and including analog-to-digital converting means operative at said successive times for converting said analog signals into said data words at each of said successive times.

7. The invention as set forth in claim 6 wherein means are provided for reading out said plurality of stored data words and weight words into said accumulating means serially bit-by-bit at least once during each of said successive times, whereby to provide successive ones of said sum words at least once during each of said successive times.

8. The invention as set forth in claim 7 including means for operating said correlation means at least once during each of said successive times, and wherein means are included in said correlation means for providing said outputs when the magnitude of the sum of consecutive correlations over a predetermined number of said successive times exceeds a certain number.

9. The invention as set forth in claim 8 including means for operating said means for adjusting said one weight word at least once during each of said successive times in response to said correlation means outputs for incrementally adjusting said one weight word.

10. The invention as set forth in claim 9 wherein means are provided for determining the sign of said one data word and applying an output representing said sign to said correlation means.

11. The invention as set forth in claim 10 including means operative to provide said sign of successive ones of said data words each for a predetermined number of said successive times, and means for operating said weight word-adjusting means to adjust said weight words which correspond to each of said successive data words, each during said predetermined number of successive times.

12. The invention as set forth in claim 5 including distortion detection means responsive to each occurrence of said sum word representing a predetermined value for providing upon occurrence of a predetermined number of sum words having said values during a given period of time an output indicating distortion in said system.

13. An adaptive equalizer which comprises:
 a. a signal memory having storage for a plurality of multibit data words;
 b. a weight memory having storage for a like plurality of multibit weight words each corresponding to a different one of said data words;
 c. a serial accumulator coupled to read out lines from said signal memory and weight memory for accumulating a sum word equal to the sum of the products of said corresponding weight words and data words;
 d. digital logic coupled to the output of said accumulator for decoding said sum word into output bits of opposite value to each other depending on the sense of the error in said sum word;
 e. a code generator for providing output codes representing different ones of said weight words;
 f. a data word sign detector coupled to the readout line from said signal memory and operated by said code generator for providing output bits of opposite value to each other depending upon the sign of the data word corresponding to the weight word represented by the code produced by said generator;
 g. a correlator including a multiplier and an accumulator, said multiplier being input coupled to said logic which produces said error sense bits and to said data word sign detector, said accumulator having overflow and underflow outputs for producing overflow bits upon occurrence of a predetermined magnitude of the sum of consecutive data word sign detector and error sense output bit products and underflow output bits upon occurrence of the negative of said magnitude;
 h. a serial adder coupled to the readout line of said weight memory and to said overflow and underflow outputs, the output of said adder being coupled to the write input of said weight memory; and
 i. means operated by said code generator for reading out bits of the weight word corresponding to said code into said last-named serial adder, whereby said weight word is incrementally adjusted and written back into said weight memory.

14. The invention as set forth in claim 13 including a timing unit for providing timing pulses for addressing said memories, operating said accumulators and said digital logic and said data word sign detector on a serial bit-by-bit basis.

15. The invention as set forth in claim 13 wherein said first-named accumulator includes a serial adder, a register for accumulating said sum words, and logic means for providing to the input of said first-named accumulator the 2's complement of the most significant bit of each weight word having a negative sign.

16. The invention as set forth in claim 13 wherein said timing unit includes a plurality of counters, a first of said counters being a product timer for providing a sequence of timing pulses one more in number than the number of bits in the product of one of said data words with one of said weight words, a second of said counters being operated by one of said product timing pulses for producing a plurality of timing pulses each corresponding to a different bit of each of said weight words, a third counter, means for starting said third counter upon coincidence of one of said product timing pulses and successive ones of said weight bit timing pulses such that said third counter provides a plurality of successive timing pulses, one for each bit of each of said data words, address lines for the bits of said signal memory being coupled to the outputs of said third counter, address lines for the bits of said weight memory being coupled to the outputs of said second counter, whereby each said data word is read and shifted in time with respect to said product timer during readout of each bit of said weight word into said accumulator.

17. The invention as set forth in claim 13 including a fourth counter and a fifth counter, means for applying pulses to said counters at successive time intervals corresponding to the time for read out of an entire data word from said signal memory into said first-named accumulator, said fifth counter having at least one additional state than said fourth counter, means for providing timing pulses corresponding to successive ones of said data words from said fourth counter and for successive ones of said weight words said fifth counter, means for providing an additional timing pulse from said fifth counter upon occurrence of said additional state thereof, and means included in said error sense decoding logic, said data word sign detector and said serial adder for adjusting said weight words operative in response to said additional timing pulse.

18. The invention as set forth in claim 13 including an analog-to-digital converter for translating input analog signals to said equalizer into data words for storage in successive word locations in said signal memory once during successive intervals.

19. The invention as set forth in claim 18 including a symbol detector coupled to the output of said first-named serial accumulator for decoding the sum words stored therein into equalized output bits representing the data represented by successive ones of said input analog signals.

20. The invention as set forth in claim 19 wherein said input analog signal is a multilevel data signal which during a preamble has fewer levels than during normal transmission, and wherein said error sense decoding logic includes means for converting said logic to respond to errors in said fewer level signals during said preamble.

21. The invention as set forth in claim 19 wherein said error sense decoding logic and said symbol detector include a plurality of flip-flops, means for transferring the most significant of the bits stored in said first serial accumulator register for storage in said flip-flops, and a plurality of digital gates for decoding the data stored in said flip-flops to provide the bits of said equalized data bits and the bits representing the sense of said error.